(12) United States Patent
Inbona (10) Patent No.: US 9,625,057 B2
(45) Date of Patent: Apr. 18, 2017

(54) MULTI-ACTIVITY PIPE-LAYING VESSEL (71) Applicant: PETROFAC LTD., St Helier (JE)

(72) Inventor: Yves Pierre Raymond Inbona, London (GB)

(73) Assignee: Petrofac Ltd., St Helier (JE)

( * ) Notice: Subject to any disclaimer, the term of this patent is extended or adjusted under 35 U.S.C. 154(b) by 0 days.

(21) Appl. No.: 14/651,758

(22) PCT Filed: Dec. 13, 2013

(86) PCT No.: PCT/EP2013/076496
§ 371 (c)(1),
(2) Date: Jun. 12, 2015

(87) PCT Pub. No.: WO2014/090980
PCT Pub. Date: Jun. 19, 2014

(65) Prior Publication Data
US 2015/0316174 A1  Nov. 5, 2015

(30) Foreign Application Priority Data
Dec. 13, 2012  (GB) .................................. 1222495.2

(51) Int. Cl.
*F16L 1/12* (2006.01)
*F16L 1/18* (2006.01)
(Continued)

(52) U.S. Cl.
CPC ................ *F16L 1/12* (2013.01); *B63B 35/03* (2013.01); *F16L 1/18* (2013.01); *F16L 1/19* (2013.01); *F16L 1/205* (2013.01); *F16L 1/207* (2013.01)

(58) Field of Classification Search
CPC ..... F16L 1/12; F16L 1/16; F16L 1/161; F16L 1/18; F16L 1/19; F16L 1/205; F16L 1/206; F16L 1/207; B63B 35/03
See application file for complete search history.

(56) References Cited

U.S. PATENT DOCUMENTS 5,464,307 A * 11/1995 Wilkins .................... F16L 1/19
405/158
6,352,388 B1 * 3/2002 Seguin .................... B63B 35/03
405/166
(Continued)

FOREIGN PATENT DOCUMENTS

GB         2 336 191 A       10/1999
WO      2008/107186 A1      9/2008
(Continued)

OTHER PUBLICATIONS

International Search Report, dated Apr. 14, 2014, from corresponding PCT application.

*Primary Examiner* — Benjamin Fiorello
*Assistant Examiner* — Aaron Lembo
(74) *Attorney, Agent, or Firm* — NLO N.V.; Catherine A. Shultz; Minerva Rivero (57) ABSTRACT

A pipe-laying vessel has a bow, a stern and a weather deck therebetween, with a moonpool passing through the weather deck. The vessel includes an S-lay pipe deployment facility located below the weather deck, having a main firing line extending along a centerline of the vessel and a pipe assembly factory for assembling single lengths of pipe to form pipe assemblies and introduce them into the firing line for deployment from the vessel. The vessel further includes a J-lay pipe deployment facility for deploying pipe through the moonpool, the J-lay pipe deployment facility including a tower located above the moon pool and pipe handling equipment for delivering pipe assemblies from the firing line to the tower. The moonpool is located to one side of the firing line. By virtue of this configuration a relatively compact structure can be achieved whereby minimal length and width dimensions for the vessel are achievable.

19 Claims, 8 Drawing Sheets (51) Int. Cl.
*F16L 1/19* (2006.01)
*F16L 1/20* (2006.01)
*B63B 35/03* (2006.01)

(56) References Cited

U.S. PATENT DOCUMENTS

| | | | |
|---|---|---|---|
| 8,888,409 B2* | 11/2014 | Ardavanis | F16L 1/19 405/166 |
| 2007/0258772 A1* | 11/2007 | Bursaux | F16L 1/203 405/166 |
| 2008/0170911 A1* | 7/2008 | Snowdon | B63B 35/03 405/166 |
| 2010/0107956 A1* | 5/2010 | Foce | B63B 35/00 114/258 |
| 2010/0119307 A1* | 5/2010 | Pollack | F16L 1/19 405/166 |
| 2010/0232884 A1* | 9/2010 | Roodenburg | F16L 1/15 405/166 |
| 2013/0294838 A1* | 11/2013 | Bianchi | F16L 1/20 405/168.1 |

FOREIGN PATENT DOCUMENTS

| | | |
|---|---|---|
| WO | 2011/010207 A1 | 1/2011 |
| WO | 2011/037459 A1 | 3/2011 |
| WO | 2012/101233 A2 | 8/2012 |

\* cited by examiner

MULTI-ACTIVITY PIPE-LAYING VESSEL

BACKGROUND OF THE INVENTION

1. Field of the Invention

The present invention relates to a pipe laying vessel and more particularly to a vessel capable of constructing a pipeline from pipe segments and laying it offshore in a number of different modes. The invention also relates to the use of such a vessel in the construction of a pipeline.

2. Description of the Related Art

Underwater pipes, cables and other structures must frequently be provided for various industries. For the oil and gas industry, pipelines may be required between rigs and wells, for transport onshore or even for transport across a body of water from one country to another. Flexible pipe is available which can be provided on a roll in relatively long segments and deployed overboard. Nevertheless, for large bore pipelines, the pipeline is constructed from individual pipe segments which must be welded together during the pipe laying procedure to form the pipeline. Such work is frequently performed using pipe-laying vessels equipped to fabricate the pipeline on board the vessel itself, and to lay the pipeline as it is fabricated. The present invention is directed to such constructed pipelines.

There are two main principles of operation for deploying constructed pipeline, generally referred to as S-lay and J-lay methods. S-laying refers to methods of fabricating the pipeline on a substantially horizontal assembly line on board the vessel, and launching the pipeline overboard via a curved laying ramp otherwise referred to as a stinger. The path of the pipeline from the vessel, through the water and along the seabed describes an S-shape. J-laying refers to a method, whereby the pipeline is deployed downwards from a substantially vertical tower. As the pipeline is lowered it adopts a J shape between the vessel and the seabed. S-laying is the preferred procedure for most situations, since it allows for greater speed of construction due to the efficient and near continuous operation of the assembly line. The J-lay procedure is generally used when working in deep water, where the weight of suspended pipe might otherwise impose excessive stress in the first overbend at the point of departure from an S-lay stinger. The J-lay procedure is considerably slower, since the operation is intermittent with each new segment of pipe being welded to the string before advancing the pipeline. Other situations may dictate use of a J-lay procedure, in particular when working close to a rig or other object.

Dedicated vessels have been developed for performing each of these procedures in an optimised manner. There are also a number of vessels that attempt to perform both procedures. One such vessel is described in WO2011010207 which provides for a preassembly line below deck for joining pipes into pipe assemblies, capable of deploying the pipeline in an S-lay mode and which also includes a J-lay tower, capable of deploying pipeline in a J-lay mode over a side of the vessel. To this end, the J-lay tower is mounted to an outboard balcony structure which adds considerable width to the vessel. The outboard position of the J-lay tower also makes it vulnerable to rolling motion of the vessel in high seas.

Another vessel is described in WO2012/101233 which has an S-lay assembly including a firing line extending along the length of the vessel and a J-lay tower located above the firing line. The vessel has an extended stern section within which an S-lay opening is provided. Combining J-lay and S-lay apparatus in a single vessel allows for operation over a multitude of depths and situations. Nevertheless, the provision of both facilities within the confines of a single vessel requires compromise, especially if it is also to provide additional facilities such as heavy lifting cranes. Additional length significantly increases the cost of a vessel. Height and width are also limited if the vessel is to pass through locks and under bridges.

It would therefore be desirable to provide a vessel which is configured to provide J-lay and S-lay operations without significantly increasing its dimensions.

BRIEF SUMMARY OF THE INVENTION

According to the invention there is provided a pipe-laying vessel having a bow, a stern and a weather deck therebetween, with a moonpool passing through the weather deck. The vessel comprises an S-lay pipe deployment facility located below the weather deck, having a main firing line extending along a centreline of the vessel and a pipe assembly factory for assembling single lengths of pipe to form pipe assemblies and introduce them into the firing line for deployment from the stern of the vessel. In this context, it should be understood that the terms bow and stern, forward and rearward are used with respect to the direction of pipe deployment in S-lay mode and are not otherwise limiting on the intended direction of motion of the vessel when not engaged in pipe deployment. The vessel further comprises a J-lay pipe deployment facility for deploying pipe through the moonpool, the J-lay pipe deployment facility comprising a tower located above the moon pool and pipe handling equipment for delivering pipe assemblies from the firing line to the tower with the moonpool being located to one side of the firing line. By virtue of the claimed configuration a relatively compact structure can be achieved whereby minimal length and width dimensions for the vessel are achievable. It will be understood, that for optimal S-lay operation, the firing line for S-lay deployment should be located as close to the centreline of the ship as possible to avoid adverse effects of rolling. By locating the moonpool to one side of the firing line, S-lay operation can proceed independently of activities through the moon pool. In particular, the overall length of the firing line need not be extended to allow for interruption by the moon pool.

In a preferred construction, the moonpool is separated from the firing line by a cofferdam extending to the weather deck. In this manner, normal access through the moonpool is only possible from above the weather deck and the pipe assembly factory and forward part of the firing line can be protected from the external environment, in particular preventing splashes and salt water from the moonpool entering the factory area.

Most preferably, the firing line comprises a weather protected area at its forward end and the moonpool extends to a position that is forward of a rearward limit of the weather protected area. The weather protected area defines the region of the firing line that is not exposed to the external environment and may be delimited by an appropriate closure or screen allowing passage of the pipe. Welding and other joining operations preferably take place within this region although it will be understood that they may also take elsewhere if required. The rearward part of the firing line comprises the tensioners, which control the rearward deployment of the pipe from the stern of the vessel. This region will generally be at least partially open to the environment. The moonpool is located amidships centred slightly rearward of the midpoint of the vessel as will further be explained below.

The moonpool is preferably rectangular in shape, having a length parallel to the centreline of at least twice its width. The elongate shape allows it to maximise the space closest to the firing line and the centreline of the vessel. It also ensures that operation can take place when the J-lay tower is tilted as will also be further described below. Preferably, the moon pool has a width of at least 7 meters to ensure passage of bulky fittings. Most preferably, the moonpool has a width of around 10 m. The moonpool preferably has a length of at least 15 m, more preferably at least 20 m. In particular, the moonpool may be flared rearwardly at the hull to allow for greater inclination of the tower while limiting obstruction on the factory deck.

According to a further aspect of the invention, the pipe assembly factory is arranged to assemble quad joints on the firing line. By taking advantage of the efficiencies of the firing line, quad joints can be made relatively quickly in a controlled manner. This may be achieved by assembling prefabricated doubles from elsewhere in the pipe assembly factory. In the following, reference to quad joints is intended to refer to assemblies of four or more assembled segments of pipe having a length of at least 40 m. Furthermore, reference to the firing line is not intended to be limiting to the exact line followed by the pipe in S-lay mode but is also intended to cover the regions adjacent to this line in which related operations and machinery is placed and to which a quad joint may be directed, without having to pass a bulkhead.

Most preferably, the pipe handling equipment comprises an elevator arranged to elevate quad joints from the firing line to the weather deck. Elevation may take place through an appropriate slot formed through the weather deck and may take place directly vertically from the firing line or from a position slightly offset from the firing line.

According to an important aspect of the invention, the elevator is located rearward of the moonpool. In this case, the quad joints may be elevated from the section of the firing line where the pipe tensioners are located for S-lay operation. With the firing line operational to produce quad joints, the tensioners can remain open. For horizontal tensioners, the quad joints may be elevated vertically from the firing line to the weather deck. For vertical tensioners, it is preferred that the quad joints are displaced laterally and elevated to the weather deck adjacent the firing line. Elevation rearward of the moonpool ensures that the quads can be transported laterally on the weather deck ready for presentation to the J-lay tower. It will be understood that this requirement imposes certain limitations on how far rearward the moonpool can be positioned, especially if a large capacity crane is to be located at the stern. It will nevertheless be understood that elevation alongside the moonpool or even forward of the moonpool is also possible, with subsequent rearward transport taking place on the weather deck. In this context, "rearward of the moonpool" is intended to mean that the main portion of the quad joint remains out of the line of the moonpool. Nevertheless, it will be understood that moonpool operation need not be obstructed if quad joints marginally overhang the moonpool.

Preferably, the pipe handling equipment comprises a loader arm arranged to up-end quad joints from the weather deck for presentation to the tower. Storage racks for the quad joints may be provided on the weather deck with transport of the quad joints to a position from which they can be raised. It is however not excluded that the loader arm may raise quad joints directly from the firing line or the factory deck to the tower. The loader arm may pivot adjacent to a base of the tower to grasp and up-end a quad joint in an end-over movement. Alternatively, the loader arm may slide up the tower to raise the quad joint. This configuration may be preferred, as it minimises the rotation of a quad joint when the tower is inclined forwards. The tower may be provided with otherwise conventional equipment for deploying the pipe, including a travelling clamp to receive an upper end of the quad joint on presentation by the loader arm and the requisite welding, testing and coating stations for perfecting the joint.

In a preferred embodiment of the invention, the pipe assembly factory extends from a position rearward of the moonpool to a position forward of the moonpool. Given that the moonpool is located amidships, adequate pipe assembly capacity may only be achievable if both the rearward and forward parts of the deck are utilised. For the purpose of the present document, this deck will be termed the factory deck, although it will be understood that it is not excluded that certain pipe assembly operations may take place on a deck lower than that of the firing line. Most preferably, the factory deck comprises conveyors for transporting pipe assemblies forwards past the moonpool on both sides thereof. In this manner, doubles and even triples may be produced on the factory deck in a process that moves the pipe assemblies from a rearward position towards the bows and which allows assemblies to be introduced into the firing line from both port side and starboard side assembly lines. Such a provision allows alternate supply of assemblies to the firing line and also avoids stoppage should one of the assembly lines be halted.

According to one embodiment, the vessel comprises a longitudinal bulkhead that intersects the moonpool, the bulkhead being provided with a first breach rearward of the moonpool for passage of pipe assemblies from inboard to outboard and a second breach forward of the moonpool for passing of pipe assemblies from outboard to inboard through the bulkhead. The pipe assemblies can thus pass the moonpool on its outboard side. The breaches should be sufficiently large for passage of pipe segments laterally. Aft of the moonpool, the first breach should allow passage of single joints. A width of at least 10 meters should be provided. There may also be two breaches, each allowing passage of a single joint. Forward of the moonpool the second breach should be able to pass at least a double joint, namely having a width of at least 20 m. It will be understood that construction of a vessel having adequate strength, in particular weight carrying capacity on the weather deck, requires bulkheads on the lower decks that are fit for purpose. Providing large openings for passage of pipe assemblies below the weather deck can require additional measures to ensure constructional stability. By intersecting the bulkhead with the moonpool, greater structural rigidity may be achieved. In particular, the bulkhead may be structurally connected to the cofferdam surrounding the moonpool.

According to a further aspect of the invention, the tower is preferably pivotably connected to the vessel, and can be tilted forwards from a vertical position to an inclined position of at least 45 degrees. The precise detail of the connection to the vessel will depend on numerous factors, including the longitudinal position with respect to the moonpool and the shape of the latter. Movement of the tower takes place under control of appropriate lifting provisions on board the vessel, e.g. hydraulic struts or with assistance from a heavy lifting crane, if present. Preferably, pivoting takes place about an axis at the weather deck. In this respect, at the weather deck is intended to include the case that the axis is just above or just below the weather deck. By pivoting the J-lay tower, the pipe can be deployed at an angle with respect to the vertical. In general, vertical deployment will be used in very deep water, while a smaller angle may be used in shallower depths. Preferably, the tower should be capable of deploying pipe at at least 30 degrees from the vertical, more preferably at least 40 degrees from the vertical. As mentioned above, a flared lower rear portion of the moonpool may facilitate a shallower angle of deployment. In addition to pivoting to a shallow deployment angle, the tower is preferably further pivotable to a still lower angle for transport. A lowered tower may be advantageous in improving the stability of the vessel by lowering the centre of gravity. It is also desirable that the tower can be lowered sufficiently to pass below key bridges such as on the Bosporus and the Panama canal. To this end, the tower can preferably be lowered to a maximum air draft of 57 m.

As discussed above, the presently described configuration ensures that the S-lay deployment facility is separate from the moonpool. According to an important aspect of the invention, the tower is arranged for performing operations through the moonpool simultaneously with operation of the S-lay pipe deployment facility to deploy the pipeline. The skilled person will understand that operations through the moon pool may comprise any manner of activity including but not limited to winching operations, recovery operations, ROV deployment and the like. Furthermore, although activity through the moonpool may be carried out using the tower, it may also be possible to perform them using a crane or alternative equipment.

In a particularly preferred form, the vessel comprises a heavy duty crane, preferably a 3000 tonne crane or even a 5000 tonne crane having a capacity to lift the given weight through the moonpool. A crane of such capacity allows the same vessel to perform both S-lay and J-lay pipe deployment and handle a stinger off the stern of the vessel while also being suitable for platform installation. Having the moonpool inboard and maximising the width of the vessel subject to width restrictions allows such a heavy duty crane to operate to full capacity. Installing the S-lay factory below deck allows deck space on the weather deck for operations with the crane, such as platform installation. Most preferably, the crane is a tub crane located on the centreline at the stern of the vessel. As described above, the stern of the vessel is defined by the direction of departure of the pipeline in S-lay mode. In an alternative configuration, a heavy duty crane may be located at the bow of the ship, preferably within operational range of the moon pool. Preferably, the crane can be lowered or collapsed for passing beneath bridges. Most preferably, the entire vessel should have an air draft of less than 57 m.

According to a further embodiment of the invention, the vessel further comprises portside and starboard loading cranes for loading of pipe segments from outboard of the vessel on both port and starboard sides and for delivering the pipe segments to pipe storage on the weather deck and/or to the factory deck. These cranes may be in addition to the heavy duty crane, which in general is not suited to such operations. The respective portside and starboard loading cranes may be positioned within operational reach of hatches through the weather deck to supply the respective pipe factories on the factory deck. The vessel is thus adapted for replenishment from either side, depending on weather conditions and other considerations. During S-lay mode it is also not excluded that the vessel may be loaded from both sides simultaneously, with pipe storage on both port and starboard portions of the weather deck.

The invention also relates to a method of laying a pipeline from a pipe-laying vessel having an S-lay firing line and a J-lay tower located adjacent to a moonpool, the method comprising deploying pipe from the vessel in J-lay mode by: fabricating doubles in a pipe factory below a weather deck of the vessel; introducing the doubles into the firing line; joining the doubles to form a quad joint on the firing line; elevating the quad joint from the firing line to the weather deck and presenting it to the tower; connecting the quad joint to the pipeline and lowering the pipeline through the moonpool. The configuration of the vessel may be otherwise as described above.

The method additionally contemplates performing S-lay deployment of pipe over a stern of the vessel. This may take place either subsequent or prior to deploying pipe in J-lay mode. An abandon and recovery procedure may be carried out on the pipeline between the respective deployments. Such abandon and recovery procedure may be otherwise conventional and may either involve complete abandon to the seabed or may involve a keelhaul operation between stern and moonpool.

BRIEF DESCRIPTION OF THE DRAWINGS

The features and advantages of the invention will be appreciated upon reference to the following drawings of a number of exemplary embodiments, in which.

DESCRIPTION OF ILLUSTRATIVE EMBODIMENTS

Figure 1:
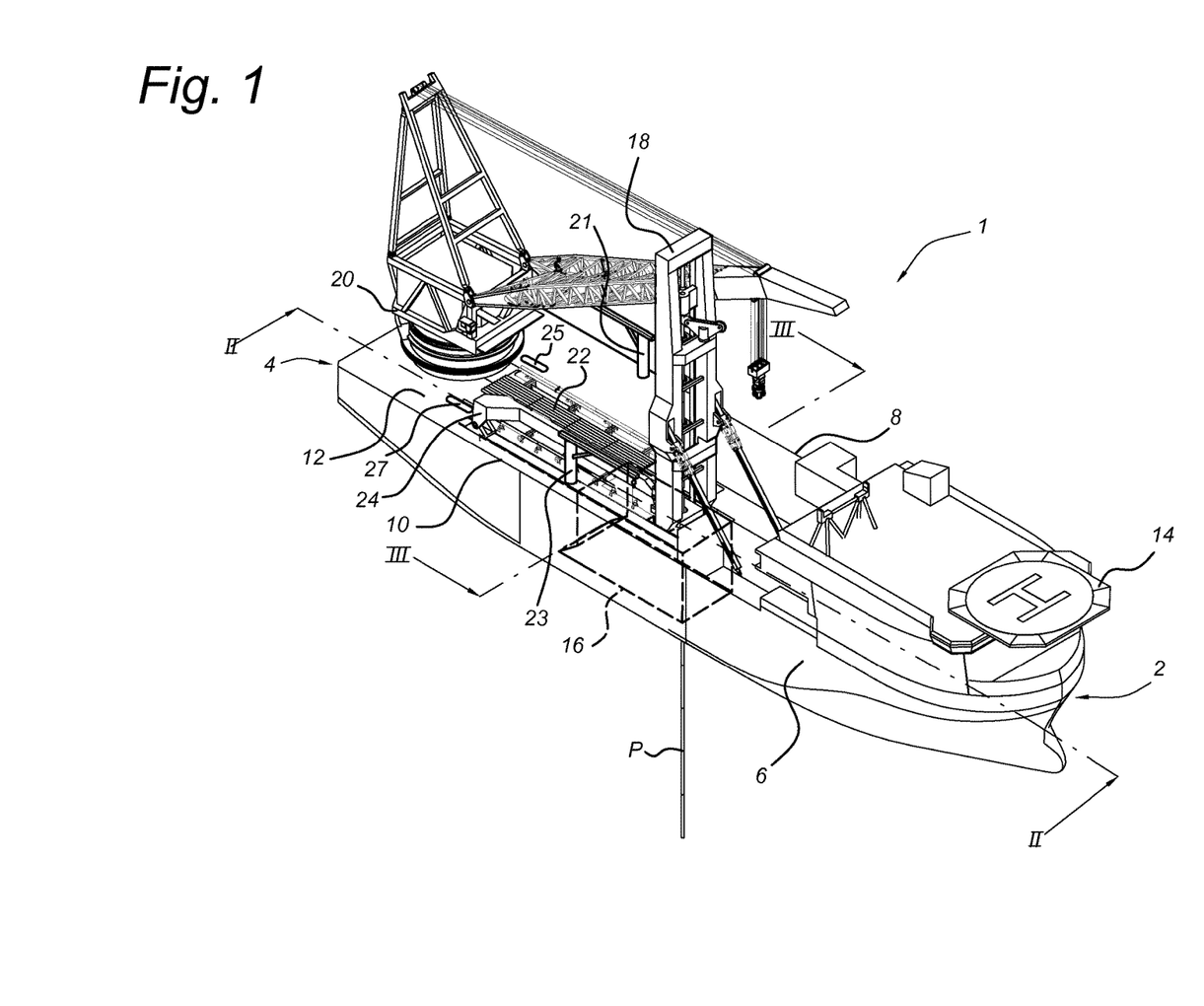
FIG. 1 shows a perspective view of a vessel according to an embodiment of the present invention.

FIG. 1 shows a perspective view of a pipe-laying vessel 1 according to the invention having a bow 2, a stern 4 and a hull 6 including port and starboard sides 8, 10. The vessel 1 has a number of decks, of which the weather deck 12 and helideck 14 are visible. A moonpool 16 is formed through the weather deck 12 amidships, extending through the hull 6 of the vessel 1. A J-lay tower 18 is depicted located above the moonpool 16, supporting a pipeline P being deployed vertically from the vessel 1 through the moonpool 16 as will be further described in detail below. On the weather deck 12 at the stern 4 of the vessel 1 is located a large tub crane 20. Between the crane 20 and the moonpool 16 is provided a transverse conveyor 22 for quad joints. The J-lay tower 18 carries a loader arm 24, which according to FIG. 1 is in a position over the transverse conveyor 22. A portside loading crane 21 and a starboard loading crane 23 are located amidships, within reach of portside singles hatch 25 and starboard singles hatch 27.

Figure 2:
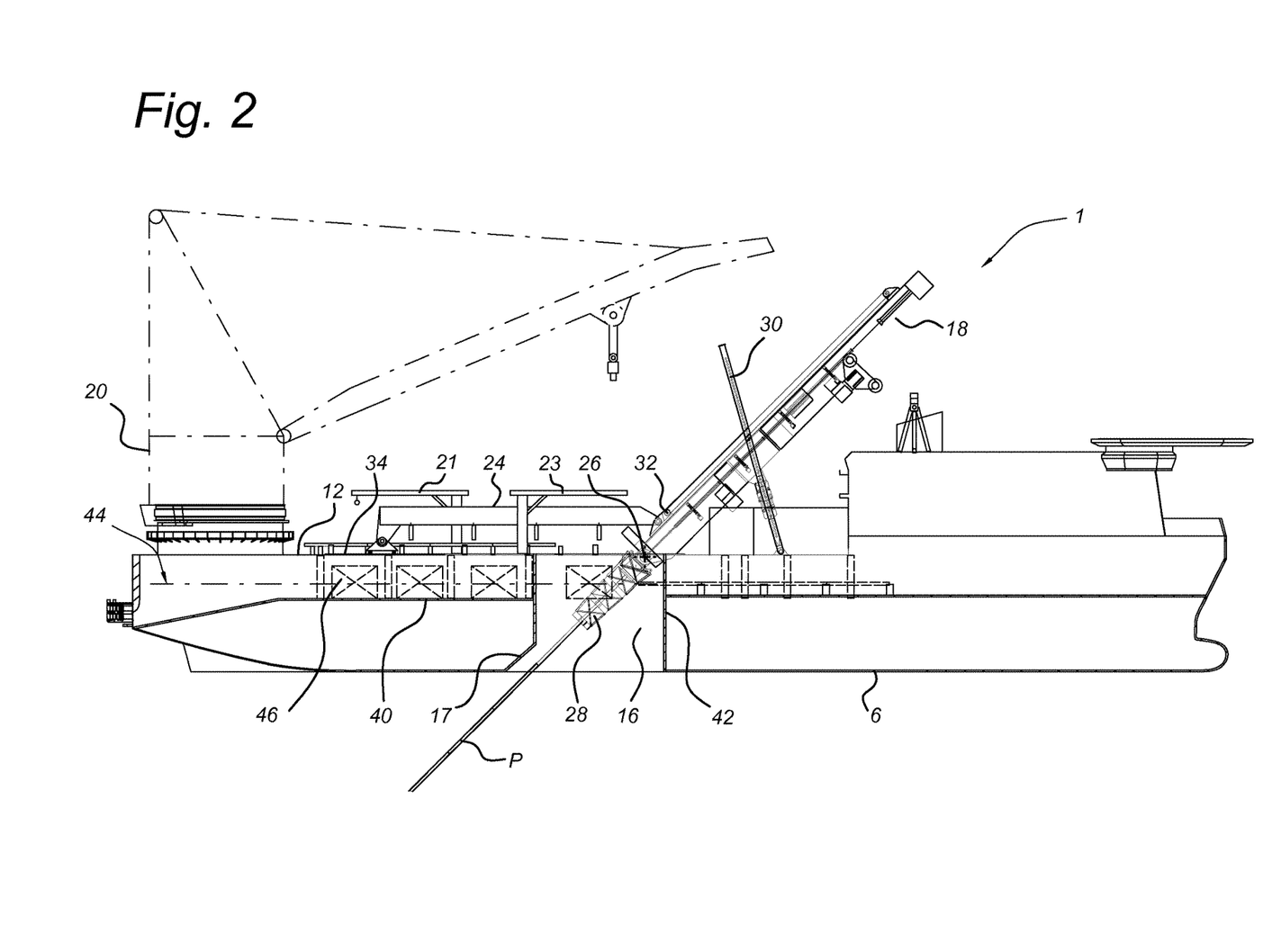
FIG. 2 shows a longitudinal section of the vessel of FIG. 1 along line II-II.

FIG. 2 shows a longitudinal cross-section through the vessel 1 of FIG. 1 through the moonpool 16 along line II-II. In this case, the vessel 1 is operating in J-lay mode with the tower 18 inclined forwards at an angle of around 45° whereby the pipeline P is deployed rearwardly through the moonpool 16. To this end, the tower 18 is connected at the weather deck 12 by a pivot 26. Below the pivot 26, the tower 18 is provided with a stinger element 28, which guides the pipeline P as it leaves the vessel 1. The elevation of the tower 18 is controlled by struts 30. As can better be seen in this view, the loader arm 24 is pivotably connected to a follower 32 which is mounted for sliding movement up the tower 18. The other end of the loader arm 24 is guided to follow a rail 34 extending along the weather deck 12. From FIG. 2, it can also be appreciated that the crane 20 is positioned and of a size to perform lifting operations through the moonpool 16.

Visible below the weather deck 12 in FIG. 2, is a factory deck 40, which will be described in further detail below. The moonpool 16 is surrounded by a cofferdam 42 which extends from the hull 6, through the factory deck 40 to the weather deck 12, whereby the factory deck 40 is effectively isolated from the moonpool 16. At the hull 6, the moonpool has a rearward flare 17 to accommodate the rearward deployment of pipeline P. The factory deck 40 carries a firing line 44 including pipe tensioners 46 for laying pipe in S-lay mode as described further below. The factory deck 40 is open to the stern 4 of the vessel 1 at the firing line 44 but can be closed by a door (not shown) for weather proofing or for the prevention of unauthorised entry to the vessel.

Figure 3:
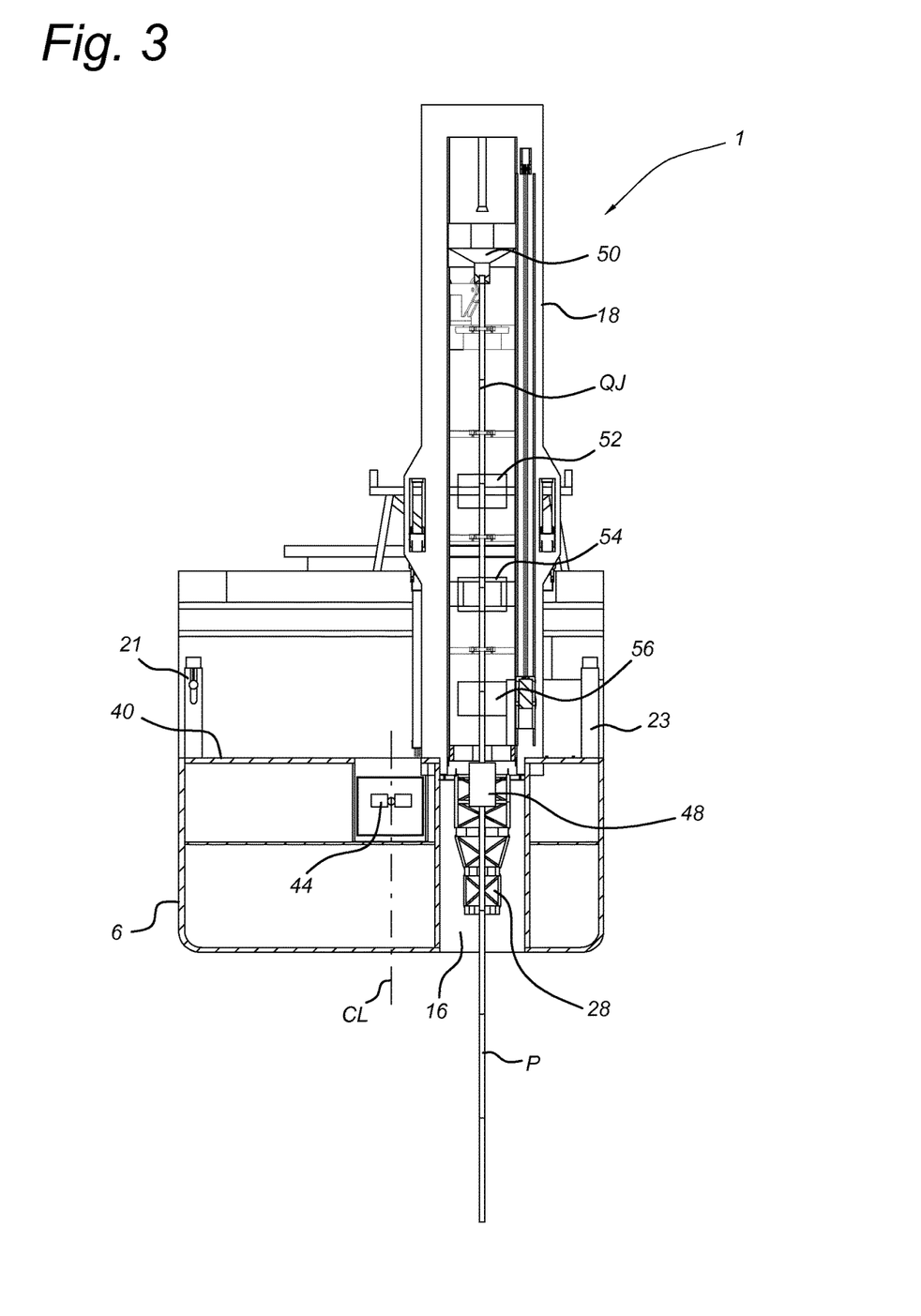
FIG. 3 shows a transverse section of the vessel of FIG. 1 along line III-III.

FIG. 3 is a cross-sectional view amidships through the vessel 1 of FIG. 1, taken in the direction III-III. As can be seen in this view, the firing line 44 is located at the centreline CL of the vessel, its position being optimised to minimise the effects of rolling motion of the vessel 1 during pipe deployment. The moonpool 16 is offset from the centreline CL to one side of the firing line 44. The J-lay tower 18 includes a hang-off station 48, which supports the weight of the pipeline through stinger element 28, a travelling block 50 for receiving the upper end of a quad joint QJ, a J-lay welding station 52, J-lay non-destructive testing station 54 and a J-lay field joint coating station 56.

Figure 4:
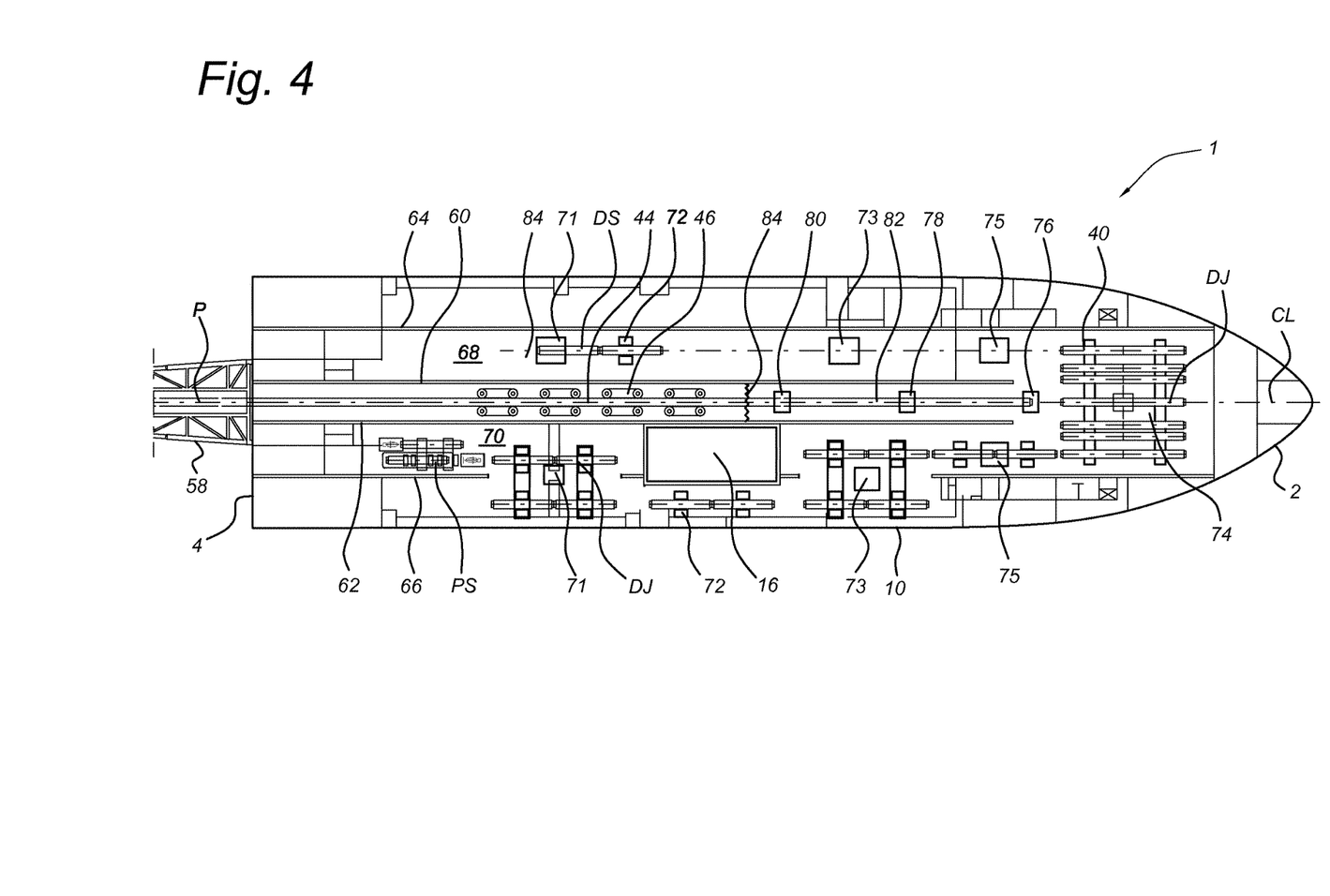
FIG. 4 shows a plan view of the factory deck of the vessel of FIG. 1.

FIG. 4 is a plan view of the factory deck 40 operational in S-lay mode, showing the firing line 44 aligned with the centerline CL of the vessel 1. At the stern 4 of the vessel 1, an S-lay stinger 58 is connected. The firing line 44 is delimited on either side by port and starboard firing line bulkheads 60, 62, that extend substantially the length of the vessel 1. Port and starboard longitudinal bulkheads 64, 66 are located outboard of the port and starboard firing line bulkheads 60, 62. The moonpool 16 is located between the starboard firing line bulkhead 62 and the starboard side 10 of the vessel and intersects the starboard longitudinal bulkhead 66. At the stern 4 of the factory deck 40, port and starboard doubles factories 68, 70 commence. The firing line 44 and the port and starboard doubles factories 68, 70 together form the S-lay pipe deployment facility. Each of the factories 68, 70 has a doubles welding station 71, a doubles testing station 73 for non-destructive testing of the weld, and a doubles field joint coating station 75. Other conventional equipment may also be provided for beveling, sawing, repairing of joints etc. Conveyors 72 are provided for automatic handling of the doubles, extending from stern 4 to the bow 2. At the forward end of the firing line 44 is provided a doubles insertion station 74 where doubles DJ from both the port and starboard doubles factories 68, 70 can be inserted into the firing line 44. Further aft on the firing line 44 are located S-lay welding station 76, S-lay testing station 78, S-lay coating station 80 and pipe tensioners 46 as described above. The region of the firing line 44 where the welding stations are located is a weather protected area 82, meaning that it is otherwise isolated from the exterior of the vessel 1. This is achieved by a curtain 84 which separates the weather protected area 82 from the rearward part of the firing line 44 which is open to the stern 4 and may be open to the weather deck above. It is nevertheless understood that openings and ventilation may also be provided to the factory deck within the weather protected area.

Figure 5:
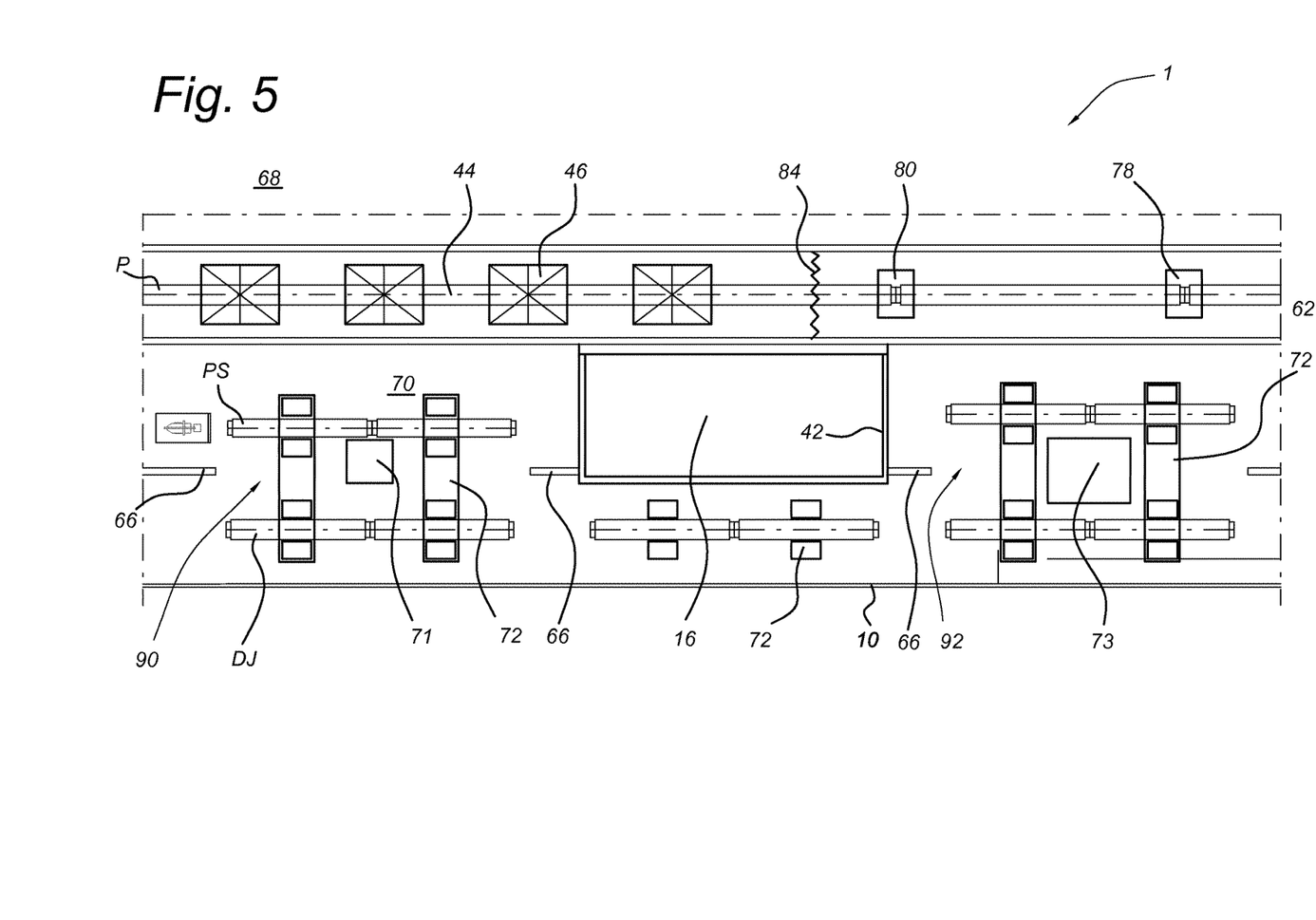
FIG. 5 shows a detail of part of the factory deck of FIG. 4.

FIG. 5 shows in greater detail part of the factory deck 40 surrounding the moonpool 16. The cofferdam 42 defines a space that is 20 m long and has a width of 10 m, allowing for the passage of the bulkiest items encountered during J-lay and also allowing sufficient width for other activities to take place through the moonpool 16 such as ROV deployment and the like. As can also be seen more clearly in FIG. 5, the starboard longitudinal bulkhead 66 connects structurally to the cofferdam 42. Rearward of the moonpool 16, the starboard longitudinal bulkhead 66 has a first breach 90 communicating from inboard to outboard of the bulkhead. The breach 90 has a length of 25 meters, being sufficient for passage of doubles while retaining sufficient structural integrity to support the weather deck 12 above. Forward of the moonpool 16 is a second breach 92 through the starboard longitudinal bulkhead 66 of similar size. Conveyors 72 are located in the space outboard of the moonpool 16, between the starboard longitudinal bulkhead 66 and the starboard side 10 of the vessel and also through the first and second breaches 90, 92. Also visible in FIG. 5 is the location of the curtain 84 in the firing line 44, adjacent to the moonpool 16. It will be understood that the actual location of the curtain 84 itself is of lesser significance. It marks however the effective end of the pipe assembly factories 68, 70 where the welding, testing and coating operations are effectively completed and where deployment of the pipeline under tension commences. It will be understood that depending on the mode and speed of operation, certain joining operations such as testing and coating may also be carried out aft of the first tensioner 46.

Figure 6:
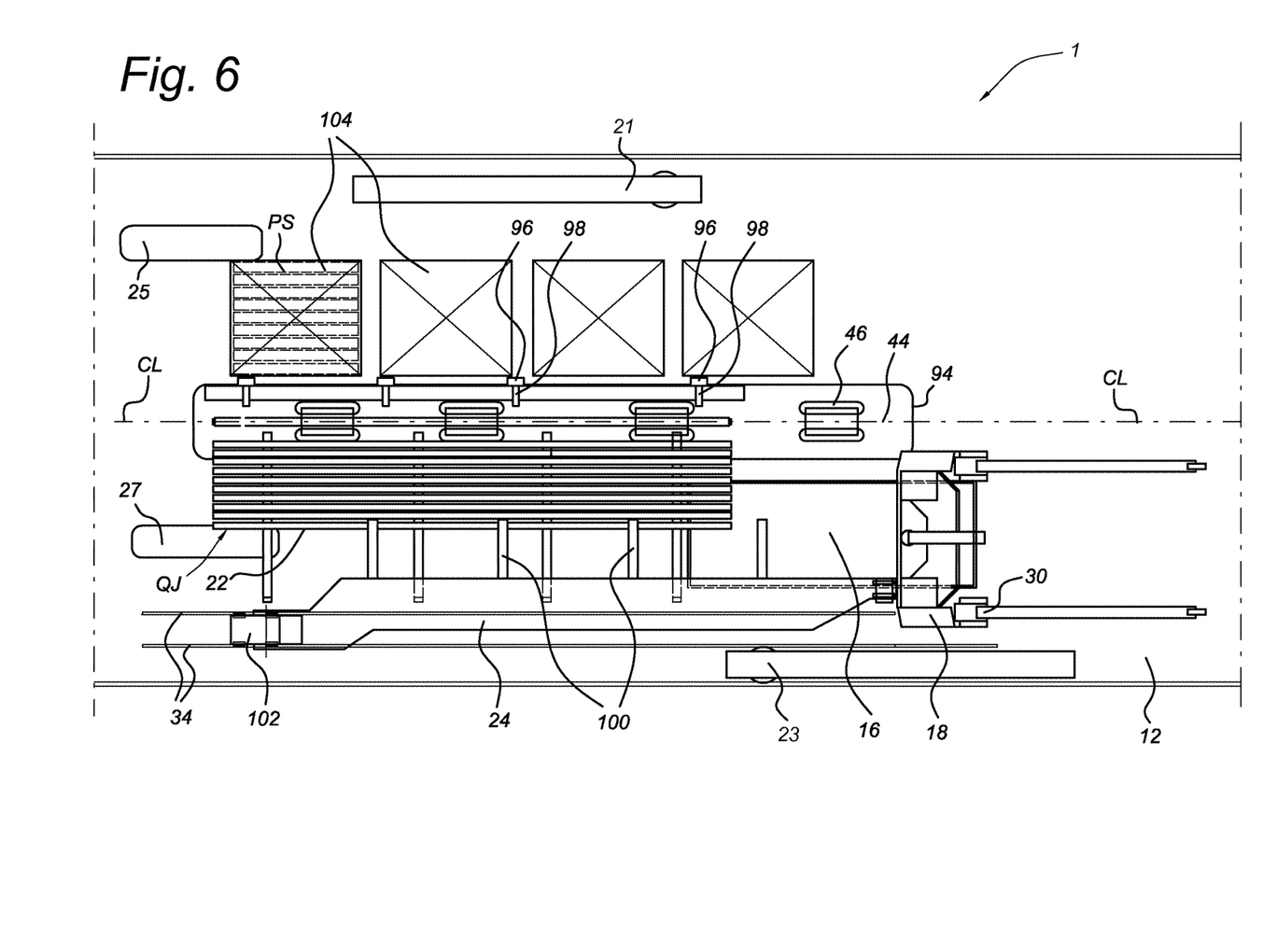
FIG. 6 shows a plan view of part of the weather deck.

FIG. 6 is a plan view of a rearward portion of the weather deck 12, showing the position of the moonpool 16, tower 18 and struts 30. On the centreline CL, extending rearward of the moonpool 16 there is located a slot 94 communicating through the weather deck 12 with the firing line 44 below. The slot may be closed during S-lay mode by a cover (not shown). An elevator 96 having elevator arms 98 extends through the slot 94 to the firing line 44. On the weather deck 12, the elevator 96 is aligned with the transverse conveyor 22 which extends to a position beneath the loader arm 24. Grabs 100 extend from the loader arm 24 in the direction of the slot 94. As previously discussed in relation to FIG. 2, the loader arm 24 is guided by a carriage 102 to follow rail 34 extending along the weather deck 12. Also shown on the rear port side of the weather deck 12 is pipe storage 104 where pipe segments PS are stored for subsequent use. The pipe segments PS may be loaded on board from the port side using portside crane 21 without further interfering with pipe deployment operations. In adverse weather conditions, pipe segments PS may also be loaded on board from the starboard crane 23. Both cranes 21, 23 are within range of a respective hatch 25, 27 through the weather deck 12 to the factory deck 40 below.

Operation of the vessel will now be discussed and explained with reference to FIGS. 1 to 6. Referring to FIGS. 4 and 5, the vessel is shown in operation laying a pipeline P in S-lay mode with stinger 58 extending from the stern 4 of the vessel 1. Operation of the starboard doubles factory 70 will be described, although it will be understood that the port doubles factory 68 operates in a similar manner. According to the invention, single pipe segments PS from pipe storage 104 are delivered to the factory deck 40 through the starboard singles hatch 27 using starboard loading crane 23 or other appropriate pipe handling equipment (not shown) and placed onto the conveyor 72. In a first step, two pipe segments PS are aligned in the doubles welding station 71 and welded together to form a double joint DJ. The double joint DJ is then passed through the first breach 90 on the conveyor 72 and transported forwards outboard of the moonpool 16 to the doubles testing station 73. Here the joint is tested and, if approved, the double joint DJ is passed inboard through the second breach 92. The double joint DJ then continues forwards between the starboard firing line bulkhead 62 and starboard longitudinal bulkhead 66 to the doubles field joint coating station 75 in the bow 2. Here, the double joint DJ is transferred laterally inboard into the firing line 44 by doubles insertion station 74. In normal operation, doubles insertion station 74 alternately introduces a double joint DJ from the port and starboard doubles factories 68, 70. It will be understood that in case of stoppage in one of the factories, the other may be operated at maximum capacity to maintain an adequate supply of double joints DJ to the firing line 44. Although in the presently described embodiment, doubles are field jointed before entering the firing line, it will be understood that all field jointing can be performed in the firing line at a single dedicated station.

On the firing line 44, the inserted double joint DJ is moved rearward into alignment with the forward end of the pipeline P at the S-lay welding station 76. Here the pipeline P and double joint DJ are welded together and the pipeline P deployed further until the newly made joint enters the S-lay testing station 78. It will be understood that although reference is made to the pipeline P moving rearwards, it is in fact the vessel 1 that moves forwards as the pipeline P is deployed. After testing, the joint moves rearwards into the S-lay coating station 80 where a field joint coating is applied. At this point, the joint procedure is complete and the pipeline P can leave the vessel 1 over the stinger 58. During deployment, control of the movement of the pipeline P is regulated by pipe tensioners 46.

As described, the S-lay pipe deployment facility operates without interaction with the moonpool 16. Should it be required, activities can thus be carried out through the moonpool 16 during S-lay operation, either by use of the tower 18, the crane 20 or any other lifting or hoisting equipment otherwise present on board. In the event that S-lay deployment is to be discontinued, the pipeline P may be abandoned overboard using conventional abandon techniques to drop the end of the pipeline P to the seabed. For subsequent operation in J-lay mode, the pipeline P is then recovered from the seabed in an otherwise conventional manner through the moonpool 16 and engaged in the hang-off station 48.

Figure 7:
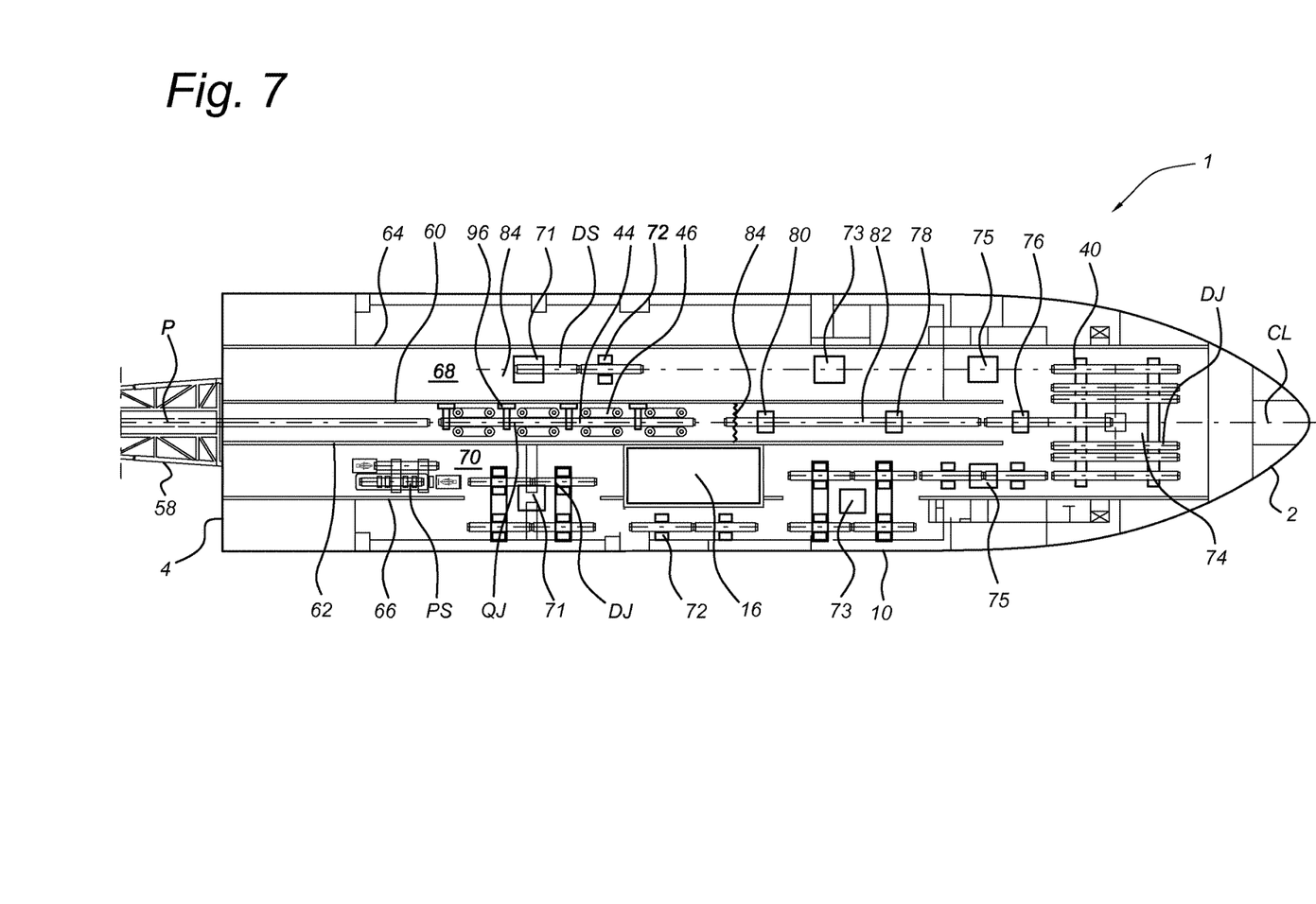
FIG. 7 shows a plan view of the factory deck in J-lay mode.

FIG. 7 shows a view of the factory deck 40 during operation of the vessel in J-lay mode. In this mode, the port and starboard doubles factories 68, 70 operate in essentially the same way as during S-lay mode and will not be further explained. A first double joint DJ is inserted into the firing line 44 at doubles insertion station 74 from the port doubles factory 68 and is advanced rearwardly along the firing line past the S-lay welding station 76. Next, a second double joint DJ is inserted into the firing line 44 at doubles insertion station 74 from the starboard doubles factory 70 and is advanced rearwardly along the firing line to the S-lay welding station 76 and into alignment with the first double joint DJ. At the S-lay welding station 76 the double joints DJ are welded together to form a quad joint QJ. The quad joint QJ is then advanced further down the firing line 44 by the length of a double joint, until the welded joint enters the S-lay testing station 78. While testing is carried out, a further double joint can be inserted into the firing line 44 at the doubles insertion station 74 from the port doubles factory 68. After testing, the quad joint QJ again moves rearwards by a double joint length, into the S-lay coating station 80 where the field joint coating is applied. At each incremental step, a further double joint DJ can be added at the doubles insertion station 74.

Once the quad joint QJ is complete, it exits from the weather protected area 82 and passes through the tensioners 46 to a position below the slot 94. The tensioners 46 are horizontal tensioners, meaning that they are capable of gripping the pipeline P or quad joint QJ laterally. They can also be opened to the position shown in FIG. 7, whereby the quad joint QJ is released. In this position, elevator 96 can engage beneath the quad joint QJ and raise it on elevator arms 98 through the slot 94 to weather deck 12. It will be understood that other forms of tensioner may also be utilised, including vertical tensioners. In that case, the quad joint may need to exit laterally before being engaged by the elevator 96. At the weather deck, the elevator 96 hands over the quad joint QJ onto the transverse conveyor 22 which places it in queue for transfer to beneath the loader arm 24. Grabs 100 extend from the loader arm 24 in the direction of the slot 94.

Figure 8:
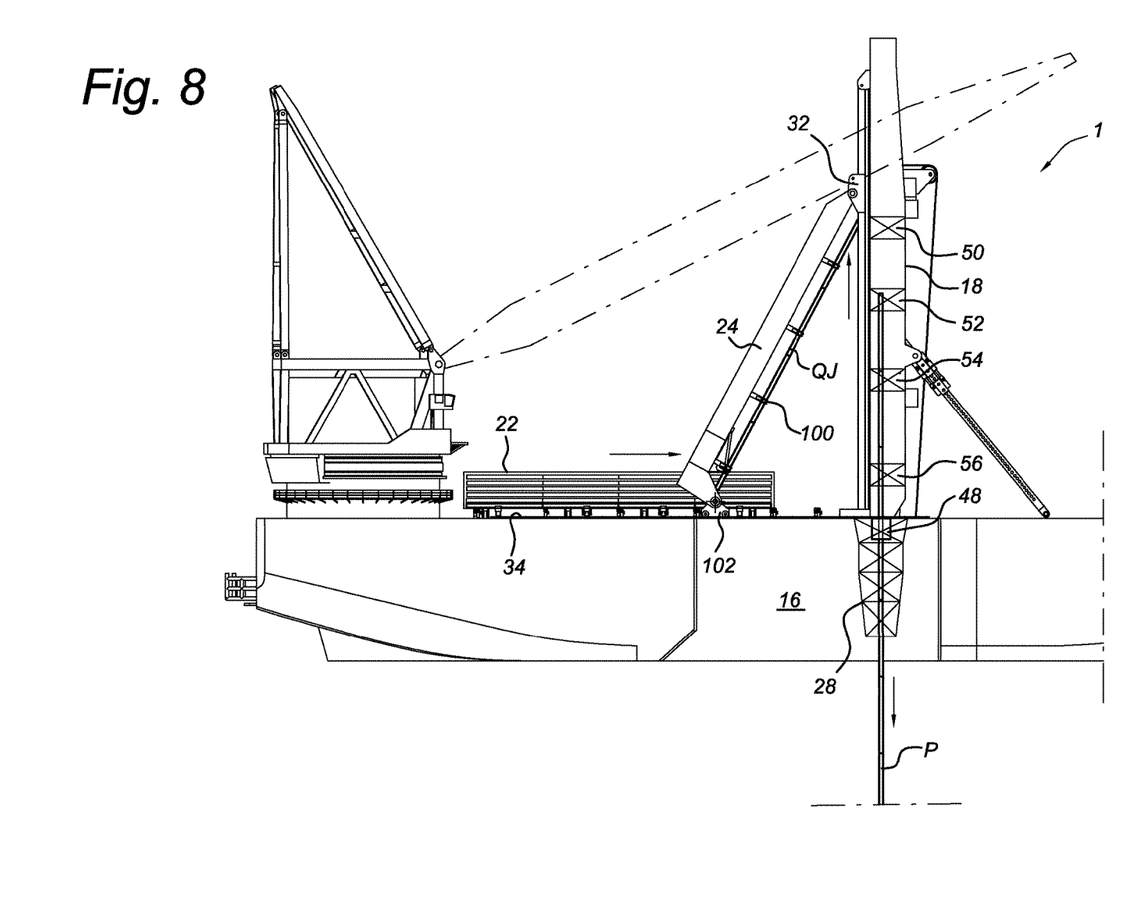
FIG. 8 shows a side view of the vessel in J-lay mode.

FIG. 8 shows a side view of the vessel 1 operating in J-lay mode. In this position, the loader arm 24 is partially raised whereby follower 32 has moved up the tower 18 and carriage 102 at the lower end of the loader arm 24 has moved forward along rail 34. The quad joint QJ is thus up-ended and presented towards the tower 18 by the grabs 100. Within the tower 18, the quad joint QJ is handed over to travelling block 50, which raises it to the maximum extent of the tower 18 for alignment with the uppermost extremity of the pipeline P, hanging from the hang-off station 48. The quad joint QJ is then welded to the pipeline P in the J-lay welding station 52 and advanced through the hang-off station by the travelling block 50 until the newly formed joint arrives at the J-lay non-destructive testing station 54. Once testing is complete, a further advancement takes place to the J-lay field joint coating station 56. During the welding, testing and coating procedure, the loader arm can return to pick up the next quad joint from the transverse conveyor 22. By providing ready made up quad joints from the factory deck, the J-lay pipe deployment facility comprising the tower 18, loader arm 24, transverse conveyor 22, elevator 96, firing line 44 and doubles factories 68, 70 can operate more efficiently and effectively than would be the case were shorter pipe strings to be added in the J-lay tower. The vessel 1 can be stocked with single pipe segments, which are significantly easier to handle, and operation in S-lay mode using double joints or J-lay mode using quad joints can be determined according to the prevailing conditions and requirements of the assignment.

Thus, the invention has been described by reference to certain embodiments discussed above. It will be recognized that these embodiments are susceptible to various modifications and alternative forms well known to those of skill in the art. In particular, it will be understood that the arrangement of the decks can be reversed with the moonpool located on a port side of the vessel. Similarly, it will be understood that S-lay pipe deployment may take place through the bow of the vessel with the vessel moving backwards. Furthermore, although certain pipe handling equipment has been depicted, this is in no way limiting on the invention and other equipment may be incorporated to the extent it achieves the stated aims.

Many modifications in addition to those described above may be made to the structures and techniques described herein without departing from the spirit and scope of the invention. Accordingly, although specific embodiments have been described, these are examples only and are not limiting upon the scope of the invention.

The invention claimed is:

1. A pipe-laying vessel having a bow, a stern and a weather deck therebetween, with a moonpool passing through the weather deck, the vessel comprising an S-lay pipe deployment facility located below the weather deck, having a main firing line extending along a centerline of the vessel extending from the bow to the stern of the vessel, and a pipe assembly factory for assembling single lengths of pipe to form pipe assemblies and introduce them into the firing line for deployment from the stern of the vessel, the vessel further comprising a J-lay pipe deployment facility for deploying pipe through the moonpool, the J-lay pipe deployment facility comprising a tower located above the moon pool and pipe handling equipment for delivering pipe assemblies from the firing line to the tower, wherein the moonpool is located to one side of the firing line.

2. The vessel according to claim 1, wherein the moonpool is separated from the firing line by a cofferdam extending to the weather deck.

3. The vessel according to claim 1, wherein the firing line comprises a weather protected area at its forward end and the moonpool extends to a position that is forward of a rearward limit of the weather protected area.

4. The vessel according to claim 1, wherein the pipe assembly factory is arranged to assemble quad joints on the firing line.

5. The vessel according to claim 1, wherein the pipe handling equipment comprises an elevator arranged to elevate quad joints from the firing line to the weather deck.

6. The vessel according to claim 5, wherein the elevator is located rearward of the moonpool.

7. The vessel according to claim 1, wherein the pipe handling equipment comprises a loader arm arranged to up-end quad joints from the weather deck for presentation to the tower.

8. The vessel according to claim 1, wherein the pipe assembly factory extends from a position rearward of the moonpool to a position forward of the moonpool and further comprises conveyors for transporting pipe assemblies forwards past the moonpool on both sides thereof.

9. The vessel according to claim 1, further comprising a longitudinal bulkhead that intersects the moonpool, the bulkhead being provided with a first breach rearward of the moonpool for passage of pipe segments from inboard to outboard and a second breach forward of the moonpool for passing doubles from outboard to inboard through the bulkhead.

10. The vessel according to claim 1, wherein the tower is pivotally connected to the vessel, preferably at the weather deck, and can be tilted forwards from a vertical position to an inclined position of at least 45 degrees.

11. The vessel according to claim 1, wherein the tower is arranged for performing operations through the moonpool simultaneously with operation of the S-lay pipe deployment facility to deploy the pipeline.

12. The vessel according to claim 1, wherein the moonpool is generally rectangular, having a length at the hull parallel to the centreline of at least twice its width.

13. The vessel according to claim 1, further comprising a heavy duty crane located at the stern of the vessel and having a capacity to lift at least 3000 tonnes through the moonpool.

14. The vessel according to claim 1, further comprising portside and starboard loading cranes for loading of pipe segments from outboard of the vessel on both port and starboard sides and for delivering the pipe segments to pipe storage on the weather deck and/or to the factory deck.

15. A method of laying a pipeline from a pipe-laying vessel having an S-lay firing line and a J-lay tower located adjacent to a moonpool, the method comprising deploying pipe from the vessel in J-lay mode by:
fabricating doubles in a pipe factory below a weather deck of the vessel;
introducing the doubles into the firing line;
joining the doubles to form a quad joint on the firing line;
elevating the quad joint from the firing line to the weather deck and presenting it to the tower;
connecting the quad joint to the pipeline and lowering the pipeline through the moonpool.

16. The method of claim 15, wherein the vessel has a bow, a stern and a weather deck therebetween, with a moonpool passing through the weather deck, the vessel comprising an S-lay pipe deployment facility located below the weather deck, having a main firing line extending along a centerline of the vessel and a pipe assembly factory for assembling single lengths of pipe to form pipe assemblies and introduce them into the firing line for deployment from the stern of the vessel, the vessel further comprising a J-lay pipe deployment facility for deploying pipe through the moonpool, the J-lay pipe deployment facility comprising a tower located above the moon pool and pipe handling equipment for delivering pipe assemblies from the firing line to the tower, wherein the moonpool is located to one side of the firing line.

17. The method according to claim 15, further comprising subsequent or prior to deploying pipe in J-lay mode, abandoning and recovering the pipeline and performing S-lay deployment of pipe over a stern of the vessel.

18. The method according to claim 15, further comprising performing auxiliary operations through the moonpool during S-lay deployment.

19. The method according to claim 15, further comprising loading pipe segments onboard the vessel from both the port and starboard sides.

* * * * *